(12) United States Patent
Otsuki

(10) Patent No.: US 12,338,605 B2
(45) Date of Patent: Jun. 24, 2025

(54) CONSTRUCTION MACHINE AND INFORMATION PROCESSING SYSTEM

(71) Applicant: SUMITOMO HEAVY INDUSTRIES, LTD., Tokyo (JP)

(72) Inventor: Shunsuke Otsuki, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 294 days.

(21) Appl. No.: 18/192,610

(22) Filed: Mar. 29, 2023

(65) Prior Publication Data
US 2023/0313498 A1 Oct. 5, 2023

(30) Foreign Application Priority Data
Mar. 31, 2022 (JP) .................. 2022-057901

(51) Int. Cl.
| | |
|---|---|
| H04W 4/80 | (2018.01) |
| E02F 9/20 | (2006.01) |
| G05D 1/00 | (2006.01) |
| G06F 9/48 | (2006.01) |
| H04W 8/24 | (2009.01) |

(52) U.S. Cl.
CPC ......... *E02F 9/2054* (2013.01); *G05D 1/0287* (2013.01); *G06F 9/4843* (2013.01); *H04W 4/80* (2018.02); *H04W 8/24* (2013.01)

(58) Field of Classification Search
CPC ......... E02F 9/2054; H04W 4/80; H04W 8/24; G05D 1/0287; G06F 9/4843
See application file for complete search history.

(56) References Cited

U.S. PATENT DOCUMENTS
2020/0181886 A1 6/2020 Togo et al.

FOREIGN PATENT DOCUMENTS
JP 2017-155557 9/2017

*Primary Examiner* — Mathew Franklin Gordon
(74) *Attorney, Agent, or Firm* — WTA Patents

(57) ABSTRACT

A construction machine includes an information processing unit configured to execute a plurality of tasks, and a communication unit configured to perform short-range wireless communication. The information processing unit is configured to execute: an inquiry process of inquiring at least one external information processing device capable of communicating with the communication unit about a degree of a margin in a processing capacity; a margin information reception process of receiving margin information representing the degree of the margin in the processing capacity from the external information processing device; a determination process of determining whether or not to request the external information processing device to execute at least a part of the plurality of tasks; a task execution request process of requesting the external information processing device to execute at least a part of the tasks; and a result reception process of receiving an execution result of the task.

12 Claims, 8 Drawing Sheets

CONSTRUCTION MACHINE AND INFORMATION PROCESSING SYSTEM

CROSS-REFERENCE TO RELATED APPLICATIONS

This application claims priority to Japanese Patent Application No. 2022-057901, filed on Mar. 31, 2022, which is incorporated by reference herein in its entirety.

BACKGROUND

Technical Field

Certain embodiments of the present invention relate to a construction machine and an information processing system.

Description of Related Art

With a wide spread of algorithms including a large amount of processing and applications that require real-time performance, such as automated construction and environmental recognition at a construction site, an information processing capacity required for a construction machine is increasing. The related art discloses that the construction machine at the construction site requests a server to execute a task including a large amount of processing via a long-range communication unit. The server executes the task requested from the construction machine and returns an execution result to the construction machine.

SUMMARY

According to an embodiment of the present invention, there is provided a construction machine including: an information processing unit configured to execute a plurality of tasks; and a communication unit configured to perform short-range wireless communication, in which the information processing unit is configured to execute: an inquiry process of inquiring at least one external information processing device capable of communicating with the communication unit about a degree of a margin in a processing capacity; a margin information reception process of receiving margin information representing the degree of the margin in the processing capacity from the external information processing device; a determination process of determining whether or not to request the external information processing device to execute at least a part of the plurality of tasks based on the received margin information; a task execution request process of requesting the external information processing device to execute at least a part of the tasks when it is determined to request the execution of the task; and a result reception process of receiving an execution result of the task from the external information processing device that has been requested to execute the task.

According to another embodiment of the present invention, there is provided a construction machine including an information processing unit configured to execute a plurality of tasks, and a communication unit configured to perform short-range wireless communication, in which the information processing unit is configured to execute: when there is an inquiry about a degree of a margin in a processing capacity from another construction machine within a range communicable with the communication unit, a process of transmitting margin information representing the degree of the margin in the processing capacity of the information processing unit to the construction machine which is an inquiry source; and when there is a request to execute the task from another construction machine within a range communicable with the communication unit, a process of executing the requested task and returning an execution result to the construction machine which is a request source.

According to still another embodiment of the present invention, there is provided an information processing system including: a construction machine including an information processing unit configured to execute a plurality of tasks, and a communication unit configured to perform short-range wireless communication; and at least one external information processing device configured to perform short-range wireless communication with the construction machine, in which the information processing unit of the construction machine is configured to execute: an inquiry process of inquiring the external information processing device about a degree of a margin in a processing capacity; a margin information reception process of receiving margin information representing the degree of the margin in the processing capacity from the external information processing device; a determination process of determining whether or not to request the external information processing device to execute at least a part of the plurality of tasks based on the received margin information; a task execution request process of requesting the external information processing device to execute at least a part of the tasks when it is determined to request the execution of the task; and a result reception process of receiving an execution result of the task from the external information processing device that has been requested to execute the task, and the external information processing device is configured to execute: when there is an inquiry about a degree of a margin in a processing capacity from the construction machine, a process of transmitting margin information representing the degree of the margin in the processing capacity of the external information processing device to the construction machine; and when there is a request to execute the task from the construction machine, a process of executing the requested task and returning an execution result to the construction machine.

DETAILED DESCRIPTION

When the construction site is located in an area with poor communication environment such as a mountainous area, the construction machine cannot communicate with the server. In addition, only with an information processing unit mounted on the construction machine, an information processing capacity may be insufficient, and information processing may not be completed within a desired time. Even in an environment in which communication with the server is not possible, it is desired that the construction machine ensures a sufficient information processing capacity and completes the information processing within a desired time.

It is desirable to provide a construction machine capable of shortening an information processing time by increasing an information processing capacity of the construction machine even in an environment in which communication with a server is not possible. Further, it is desirable to provide an information processing system including the construction machine.

The construction machine communicates with the external information processing device by short-range wireless communication, requests the external information processing device to execute a part of the tasks, and receives the execution result from the external information processing device. Thus, even in a case where communication with the server is not possible, the information processing capacity can be enhanced.

A construction machine and an information processing system according to an embodiment will be described with reference to FIGS. 1 to 3.

Figure 1:
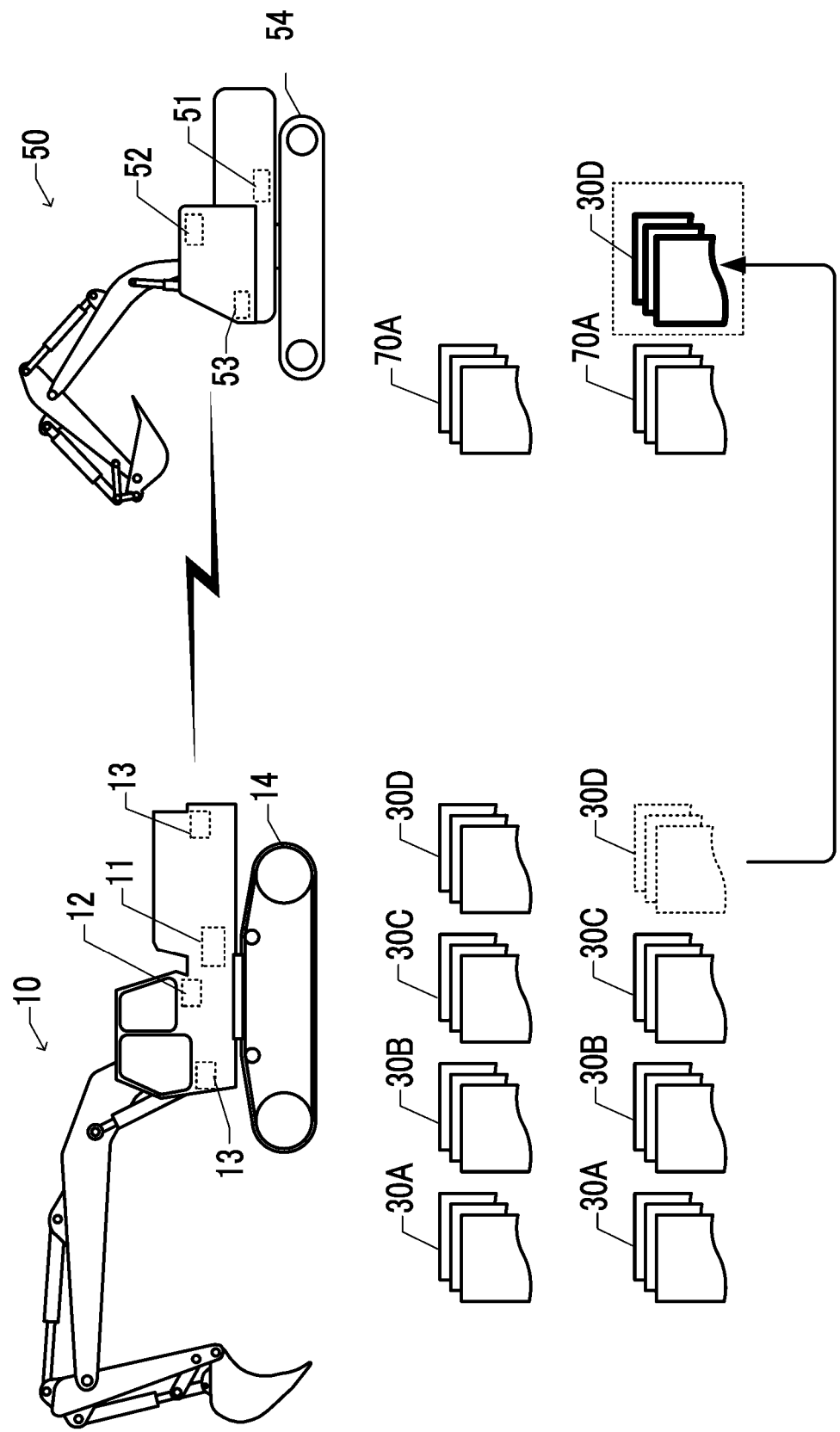
FIG. 1 is a schematic view of an information processing system including two construction machines according to an embodiment.

FIG. 1 is a schematic view of an information processing system including two construction machines 10 and 50 according to the present embodiment. One construction machine 10 is an excavator including an information processing unit 11, a communication unit 12, a sensor 13, and a running mechanism 14, and the other construction machine 50 is an excavator including an information processing unit 51, a communication unit 52, a sensor 53, and a running mechanism 54. The information processing unit 11 is realized by, for example, hardware and software of a computer.

Each of the communication units 12 and 52 is capable of performing short-range wireless communication and performing long-range wireless communication. Examples of the short-range wireless communication standard to be used include Bluetooth (registered trademark) having a communicable distance up to about 10 meters, WiFi having a communicable distance up to several hundred meters, and the like. Examples of the long-range wireless communication standard to be used include LTE, a fifth-generation mobile communication system (5G), and the like. The sensors 13 and 53 can measure a three-dimensional shape of a terrain, a surrounding obstacle, and the like. For example, a camera, LiDAR, or the like can be used as the sensors 13 and 53. The information processing units 11 and 51 each perform information processing necessary for the construction machines 10 and 50 to perform various operations.

The information processing is realized by executing a plurality of tasks. For example, the information processing unit 11 of one construction machine 10 analyzes an image acquired by the sensor 13 and creates an environmental map. A plurality of the sensors 13 are mounted on the construction machine 10, analyze images acquired by each of the plurality of sensors 13, and join analysis results to create an environmental map around the construction machine 10. A series of coherent information processing realized by executing a plurality of tasks is referred to as a job. One job includes a plurality of tasks that can be processed in parallel. For example, one task analyzes a part of the whole image data to create a part of the environmental map.

Furthermore, the information processing unit 11 of one construction machine 10 is capable of executing, when having a margin in a processing capacity, at least a part of a plurality of tasks included in a job to be executed by the construction machine 50 in response to a request from the other construction machine 50 and returning an execution result to the construction machine 50 which is a request source. In this case, the construction machine 10 serves as an external information processing device for the construction machine 50. In addition, when the other construction machine 50 inquires about the margin in the processing capacity, the information processing unit 11 of the construction machine 10 returns margin information indicating a degree of the margin in the processing capacity of the information processing unit 11 to the construction machine 50 which is an inquiry source. The processing capacity can also be referred to as a resource amount of a computational resource. The degree of the margin in the processing capacity can also be referred to as a free resource amount of the computational resource at the present time.

Similarly, the information processing unit 51 of the other construction machine 50 also performs a process (job) of creating an environmental map, a process of replying to an inquiry about a degree of a margin in a processing capacity, and a process of executing a requested task and returning an execution result to the construction machine 10 which is a request source. In this case, the construction machine 50 serves as an external information processing device for the construction machine 10. The processing capacity (resource amount) can be defined, for example, by a size of image data that can be processed per unit time.

Next, as an example, a case where the information processing unit 11 needs to execute four tasks 30A to 30D when the construction machine 10 performs certain work will be described. When four tasks 30A to 30D are executed only by the information processing unit 11, it takes time and the work is delayed. The construction machine 50 is executing one task 70A and has a margin in a processing capacity. In addition, a distance from the construction machine 10 to the construction machine 50 is set to the extent that short-range wireless communication is possible with each other.

The information processing unit 11 of the construction machine 10 inquires the other construction machine 50 about the degree of the margin in the processing capacity. When there is the margin in the processing capacity of the construction machine 50, the construction machine 50 is requested to execute one task 30D among the plurality of tasks 30A to 30D. The request for execution of the task is performed by transmitting a program for executing the task and image data to be processed by the program from the construction machine 10 to the other construction machine 50. In addition, an application program for executing a task may be installed in the information processing unit 51 of the construction machine 50 and only a command and the image data may be transmitted to the construction machine 50.

The information processing unit 11 executes the remaining three tasks 30A to 30C. By receiving the execution result of the task 30D from the construction machine 50 and integrating the execution results of four tasks 30A to 30D, information necessary for the work, for example, an environmental map is created.

Figure 2:
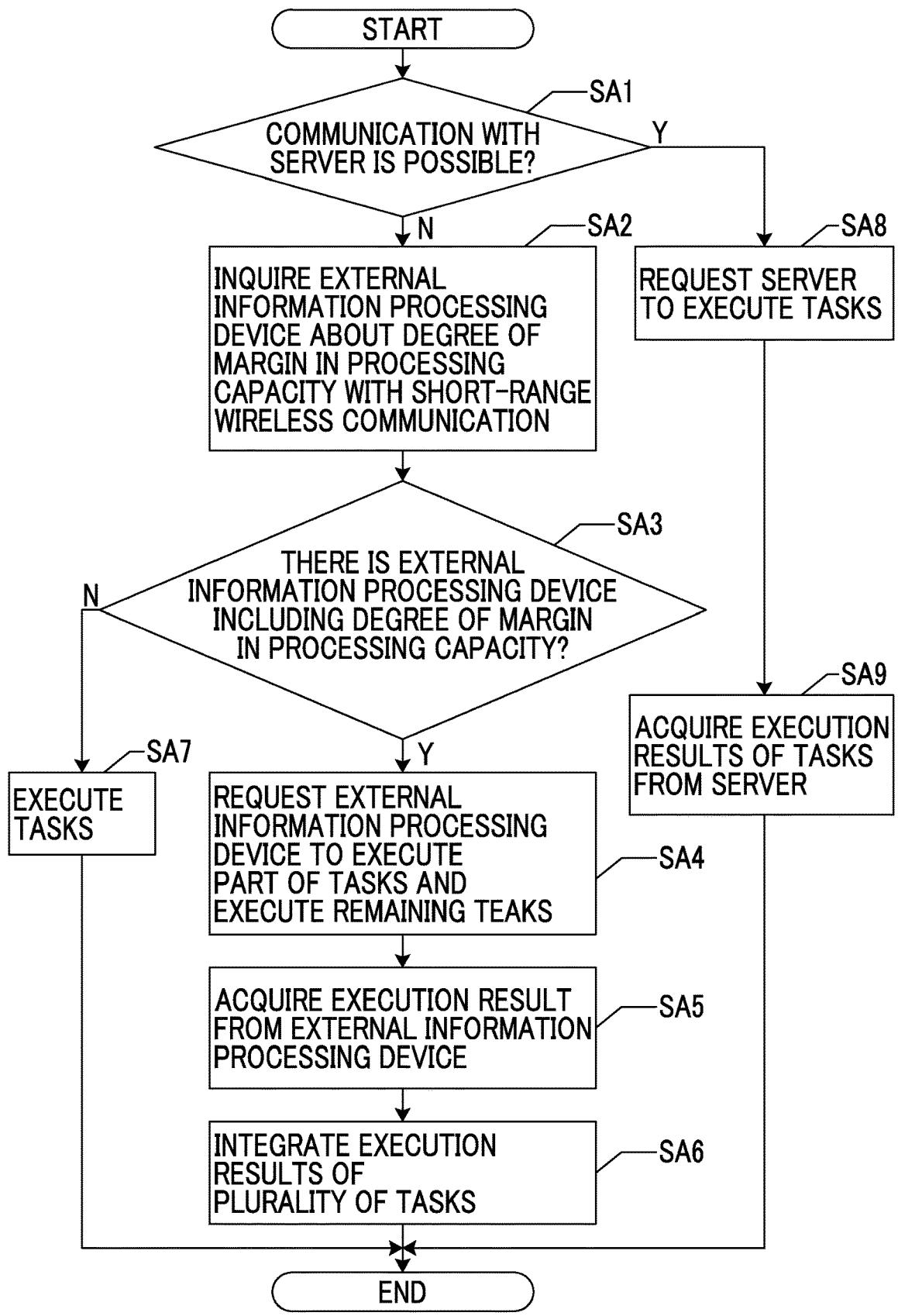
FIG. 2 is a flowchart showing a procedure of processing executed by an information processing unit of the construction machine according to the embodiment shown in FIG. 1.

FIG. 2 is a flowchart showing a processing procedure of the information processing unit 11 of the construction machine 10 (FIG. 1) that requests an external information processing device to execute a task. When a plurality of tasks to be processed by the construction machine 10 occur, the information processing unit 11 determines whether or not long-range communication with a server is possible (step SA1). In a case where a work site of the construction machine 10 is located in a mountainous area or the like and is outside a service providing area for long-range communication, the communication with the server is not possible. In a case where communication with the server is not possible, the information processing unit 11 executes an inquiry process of inquiring an external information processing device, that is, the construction machine 50 (FIG. 1) about the degree of the margin in the processing capacity by using a short-range wireless communication function (step SA2).

When a margin information reception process of receiving the margin information indicating the degree of the margin in the processing capacity from the construction machine 50 is executed, the information processing unit 11 executes a determination process of determining whether or not there is an external information processing device having the margin in the processing capacity (step SA3). In a case where an external information processing device having the margin in the processing capacity is found, the information processing unit 11 requests the external information processing device, that is, the construction machine 50, to execute a part of the plurality of tasks required for the work of the construction machine 10 (performs a task execution request process) and executes the remaining tasks (step SA4).

Thereafter, the information processing unit 11 acquires an execution result of the task from the external information processing device, that is, the construction machine 50 (executes a result reception process) (step SA5). Thereafter, the information processing unit 11 integrates the execution result of the task executed by the external information processing device and an execution result of the task executed by the information processing unit 11 (step SA6). Thus, information necessary for the work, for example, an environmental map or the like is created.

In step SA3, in a case where the external information processing device having the margin in the processing capacity is not found, the information processing unit 11 executes all the tasks (step SA7). Thus, information necessary for the work, for example, an environmental map or the like is created.

In a case where it is determined in step SA1 that communication with the server is possible, the information processing unit 11 requests the server to execute all the tasks (step SA8). Thereafter, the execution results of the tasks are acquired from the server (step SA9). Thus, information necessary for the work, for example, an environmental map or the like can be obtained.

Figure 3:
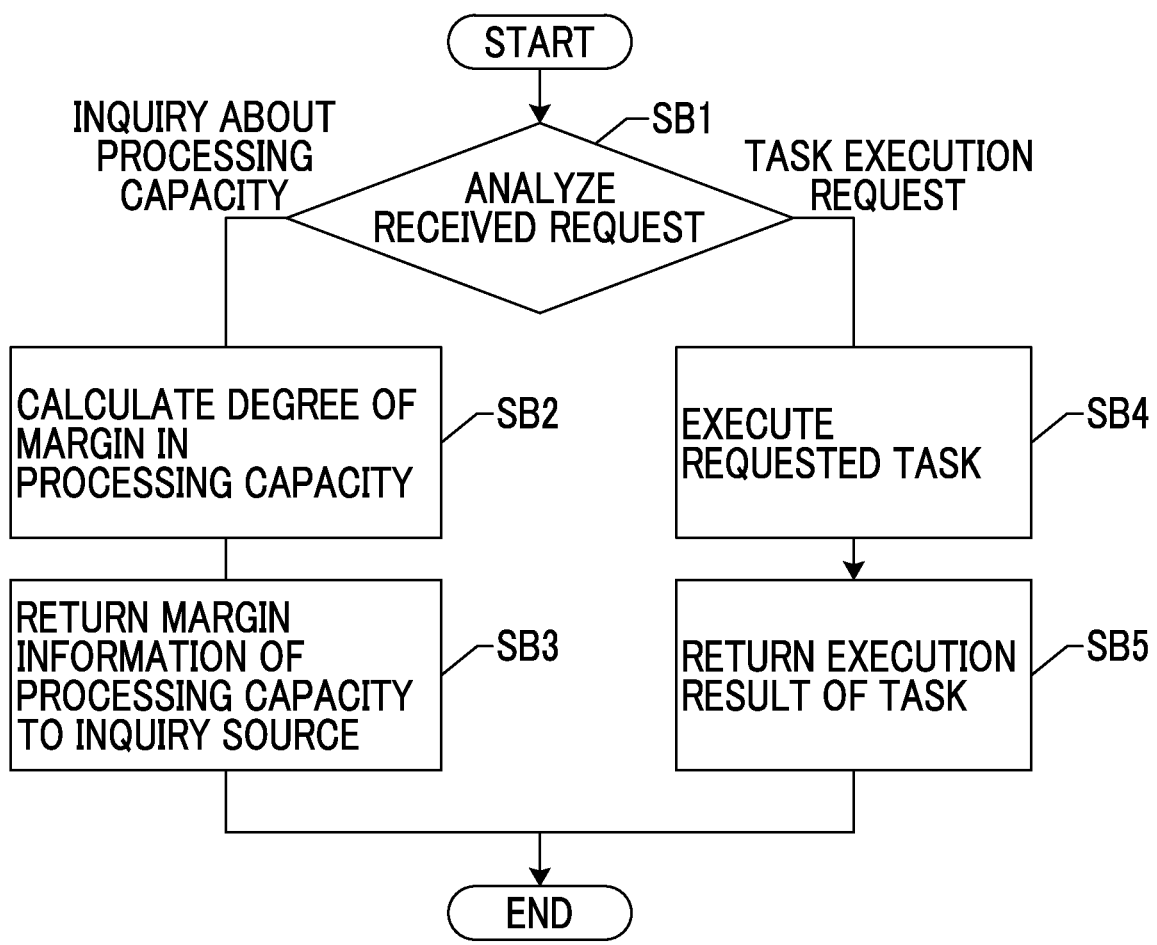
FIG. 3 is a flowchart showing a procedure of processing executed by an information processing unit of another construction machine that functions as an external information processing device for the construction machine for which the flowchart is shown in FIG. 2.

FIG. 3 is a flowchart showing a processing procedure of the information processing unit 51 of the construction machine 50 (FIG. 1) that functions as an external information processing device for the construction machine 10.

As shown in FIG. 3, the information processing unit 51 of the construction machine 50 analyzes the received request (step SB1). In a case where the received request is an inquiry about the degree of the margin in the processing capacity, the information processing unit 51 calculates the degree of the margin in the processing capacity based on an execution status of the task at the present time (step SB2). Thereafter, the information processing unit 51 returns the margin information indicating the degree of the margin in the processing capacity to the construction machine 10 which is an inquiry source (step SB3).

When the received request is a task execution request, the information processing unit 51 executes the task requested to be executed (step SB4). When the execution of the task is completed, the information processing unit 51 returns the execution result to the construction machine 10 (step SB5).

Next, excellent effects of the present embodiment will be described.

In the present embodiment, a part of the plurality of tasks to be executed by one construction machine 10 is executed by the other construction machine 50. In this way, two construction machines 10 and 50 construct a distributed processing network by short-range wireless communication. Accordingly, in a case where the construction machines 10 and 50 cannot communicate with the server, the other construction machine 50 having the margin in the processing capacity executes a part of the plurality of tasks to be executed by one construction machine 10. Since the plurality of tasks including a large amount of processing are distributed and processed by two construction machines 10 and 50, it is possible to compensate for a shortage of the computational resource of one construction machine 10 and shorten the processing time.

The construction machine 10 can execute, by the external information processing device, a part of the plurality of tasks to be processed. Therefore, a computer having a low processing capacity can be used for the information processing unit 11. Therefore, it is possible to reduce the cost of the construction machine 10 on which the information processing unit 11 is mounted.

Next, a modification example of the present embodiment will be described.

In the present embodiment, a distributed processing network constructed by short-range wireless communication is used in a case where communication with the server is not possible. However, a configuration not connected to the server may be adopted. For example, in order to connect the construction machine to the server, a long-range wireless communication line such as a fifth-generation mobile communication system (5G) must be used, which increases the communication cost. The communication cost can be reduced by adopting a configuration in which the construction machine is not connected to the server.

Further, in the present embodiment, a plurality of construction machines for constructing a distributed processing network analyze image data acquired by a sensor mounted on one construction machine. As a modification example thereof, image data acquired by a plurality of sensors mounted on a plurality of construction machines may be analyzed by the plurality of construction machines, and the created environmental maps may be integrated to create a wider range of environmental maps.

When the construction machine 50 is not performing work, the construction machine 50 is set to a state in which information processing and communication can be performed and is maintained in a state in which a computational resource can be provided to the other construction machine 10 at any time in response to a request (hereinafter, referred to as a computational resource provision mode). An operator of the construction machine 50, a worker at a work site, or the like may operate the construction machine 50 to set the construction machine 50 to the computational resource provision mode. Accordingly, even in a case where the construction machine 50 is not performing work and is in a dormant state, the construction machine 50 can be utilized.

In a case where the construction machine 50 is an electric excavator, power may be supplied from an internal battery to the information processing unit 51 and the communication unit 52 in the computational resource provision mode. In a case where the construction machine 50 is an excavator with an internal combustion engine, minimum necessary standby power may be supplied to the information processing unit 51 and the communication unit 52, and when the execution of the task is requested from the other construction machine 10, the internal combustion engine may be operated to generate power.

In the present embodiment, an example in which the construction machines 10 and 50 are excavators has been described. However, the construction machines 10 and 50 may be construction machines other than the excavator, for example, a bulldozer, a truck, or a crane.

Next, a construction machine and an information processing system according to another embodiment will be described with reference to FIG. 4. Hereinafter, description of a configuration common to the construction machine and the information processing system according to the embodiment described with reference to FIGS. 1 to 3 will not be repeated.

Figure 4:
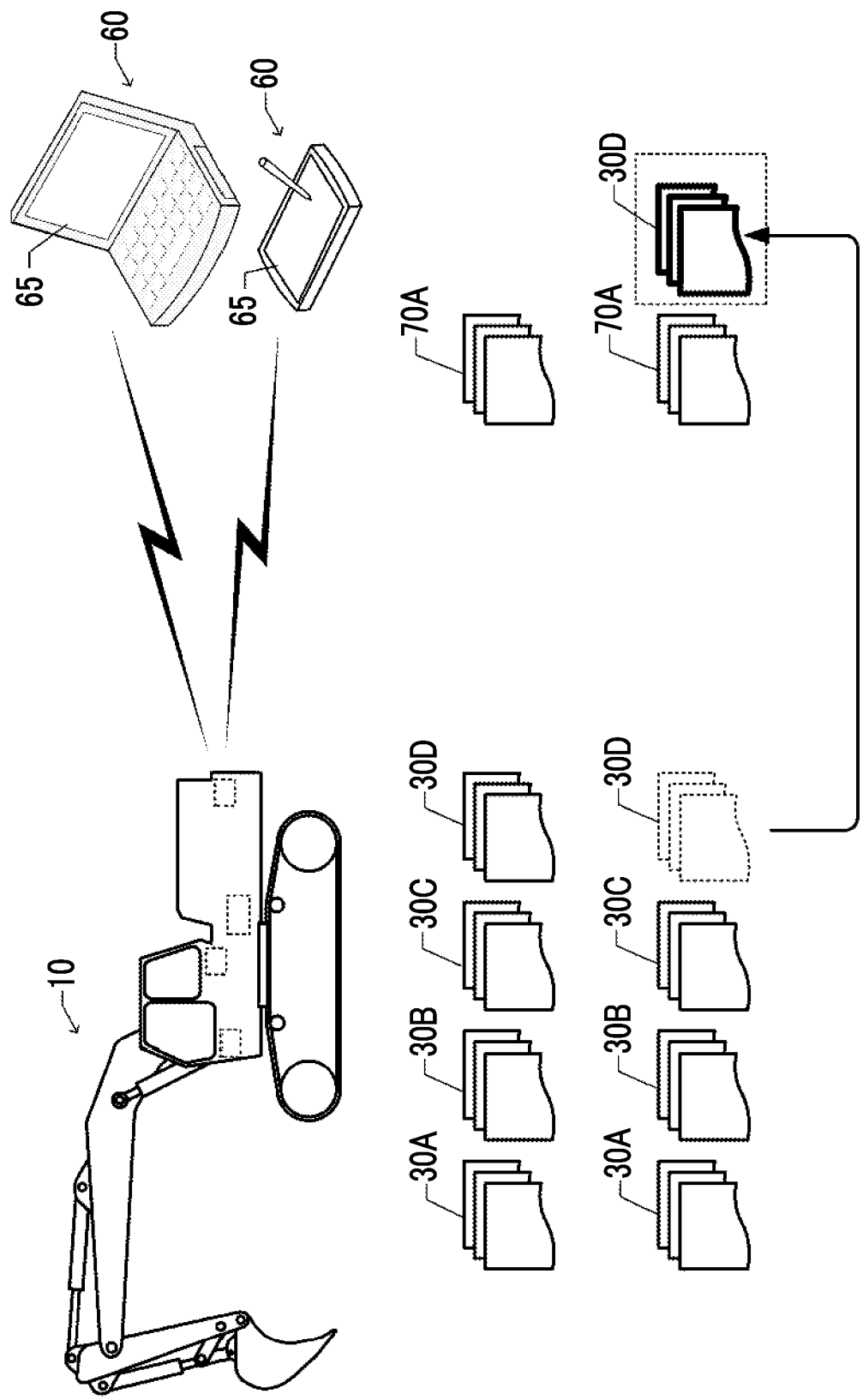
FIG. 4 is a schematic view of a construction machine and an information processing system according to another embodiment.

FIG. 4 is a schematic view of a construction machine and an information processing system according to the present embodiment. In the embodiment shown in FIGS. 1 to 3, the distributed processing network is constructed by two construction machines 10 and 50. On the other hand, in the present embodiment, one construction machine 10 and at least one other external information processing device 60 construct a distributed processing network. The information processing device 60 includes a display unit 65. As the external information processing device 60, a portable computer, a tablet terminal, a smartphone, or the like is used.

The external information processing device 60 performs short-range wireless communication with the construction machine 10. Further, the external information processing device 60 replies to an inquiry about the degree of the margin in the processing capacity (step SB3), executes the requested task (step SB4), and returns the execution result of the task (step SB5) as shown in FIG. 3. For example, the external information processing device 60 executes a partial task 30D among the plurality of tasks 30A to 30D to be executed by the construction machine 10. By installing the application program in the portable computer, the tablet terminal, the smartphone, or the like in advance, the portable computer, the tablet terminal, the smartphone, or the like can be operated as the external information processing device 60.

Next, excellent effects of the present embodiment will be described.

In the present embodiment, even when another construction machine is not provided at a work site of the construction machine 10, the distributed processing network can be constructed by using an information processing terminal such as a portable computer.

Next, a construction machine and an information processing system according to still another embodiment will be described with reference to FIG. 5. Hereinafter, description of a configuration common to the construction machine and the information processing system according to the embodiment described with reference to FIGS. 1 to 3 will not be repeated.

Figure 5:
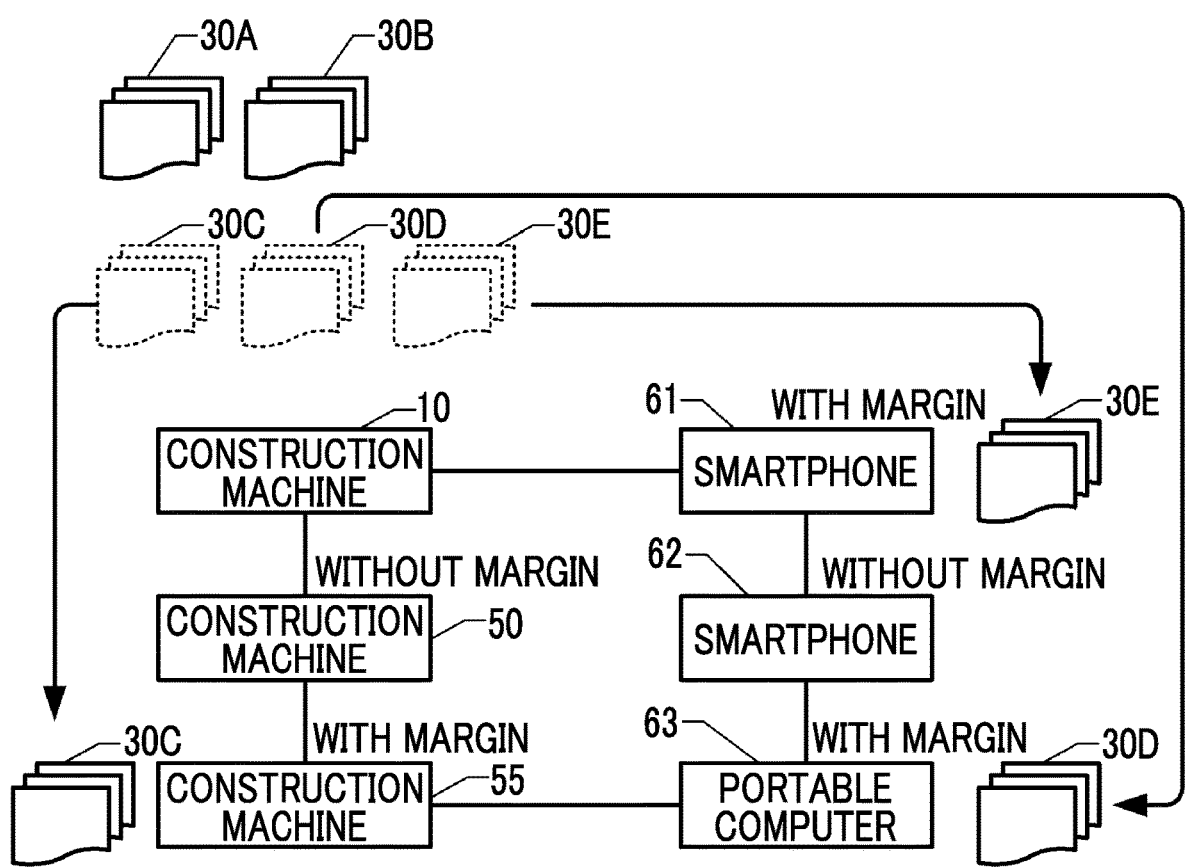
FIG. 5 is a schematic view of a construction machine and an information processing system according to still another embodiment.

FIG. 5 is a schematic view of a construction machine and an information processing system according to the present embodiment. In the embodiment described with reference to FIGS. 1 to 3, the distributed processing network is constructed by two construction machines 10 and 50. On the other hand, in this embodiment, at least one construction machine and a plurality of external information processing devices form a distributed processing network. As the distributed processing network, a serverless communication system, for example, a permissionless network (for example, CAN) or a mechanism for bucket-relaying information (for example, a blockchain) can be used.

For example, three construction machines 10, 50, and 55, two smartphones 61 and 62, and one portable computer 63 are connected by a local area network such as WiFi to construct a distributed processing network. The construction machines 10, 50, and 55, the smartphones 61 and 62, and the portable computer 63 connected to the local area network are referred to as members of the distributed processing network.

Each of the plurality of members of the distributed processing network is capable of inquiring another member about the degree of the margin in the processing capacity (step SA2 in FIG. 2) and requesting the other member to execute at least a part of the plurality of tasks (step SA4 in FIG. 2). In addition, when there is an inquiry about the degree of the margin in the processing capacity from the other member, each of the plurality of members is capable of calculating the degree of the margin in the processing capacity thereof (step SB2 in FIG. 3) and returning the margin information (step SB3 in FIG. 3). When there is a request to execute a task, each of the plurality of members is capable of executing the task for which execution is requested (step SB4 in FIG. 3) and returning an execution result (step SB5 in FIG. 3).

Next, an example of a procedure in a case where one construction machine 10 requests a plurality of the other members of the distributed processing network to execute the task will be described. In the following description, FIGS. 2 and 3 will be referred to as necessary. Hereinafter, a case where it is necessary to execute five tasks 30A to 30E when the construction machine 10 performs the work will be described.

First, the construction machine 10 inquires a plurality of the other members about the degree of the margin in the processing capacity (step S2). The plurality of members receiving the inquiry, that is, the construction machines 50 and 55, the smartphones 61 and 62, and the portable computer 63 calculate the degree of the margin in their processing capacity (step SB2) and returns the calculated margin information to the construction machine 10 (step SB3).

The construction machine 10 determines whether or not there is a member having a margin in the processing capacity, based on the margin information returned from a plurality of the other members (step SA3). For example, when there is a margin in the processing capacity of the construction machine 55, the smartphone 61, and the portable computer 63, the construction machine 10 requests each of the members to execute a part of the tasks (step SA4). For example, the construction machine 10 requests the construction machine 55, the portable computer 63, and the smartphone 61 to execute the tasks 30C, 30D, and 30E, respectively, among the tasks 30A to 30E to be executed by the construction machine 10. Further, the construction machine 10 executes the remaining tasks 30A and 30B (step SA4).

The construction machine 55, the portable computer 63, and the smartphone 61 execute the tasks 30C, 30D, and 30E, respectively (step SB4), and return the execution results to the construction machine 10 (step SB5). The construction machine 10 acquires the execution results of the tasks from each of the construction machine 55, the portable computer 63, and the smartphone 61 (step SA5). Thereafter, the construction machine 10 integrates the execution results of the tasks 30A to 30E (step SA6).

Next, excellent effects of the embodiment shown in FIG. 5 will be described.

In the embodiment shown in FIG. 5, the member included in the distributed processing network can use the computational resources of a plurality of the other members. Therefore, it is possible to shorten the execution time of various jobs having a large computational load. In addition, it is possible to reduce an information processing capacity of each of the plurality of members. As a result, it is possible to reduce the cost of each of the construction machines 10, 50, and 55 which are the members.

Next, a modification example of the embodiment shown in FIG. 5 will be described.

Although the distributed processing network according to the embodiment shown in FIG. 5 is a serverless type network, one member out of the plurality of members may have a role of the server. For example, a member functioning as a server may ascertain the degree of the margin in the processing capacity of a plurality of members, and each member may request the member functioning as a server to allocate computational resources of the distributed processing network. The member functioning as a server may allocate the computational resources of the distributed processing network to each member in response to a request from each member.

A priority may be given to each of the plurality of members, and the member functioning as a server may preferentially allocate the computational resource to the member having a high priority. In addition, a priority may be given to a job to be executed, and the computational resource may be preferentially allocated to a job having a high priority.

Next, a construction machine and an information processing system according to still another embodiment will be described with reference to FIG. 6. Hereinafter, description of a configuration common to the construction machine and the information processing system according to the embodiment described with reference to FIGS. 1 to 3 will not be repeated.

Figure 6:
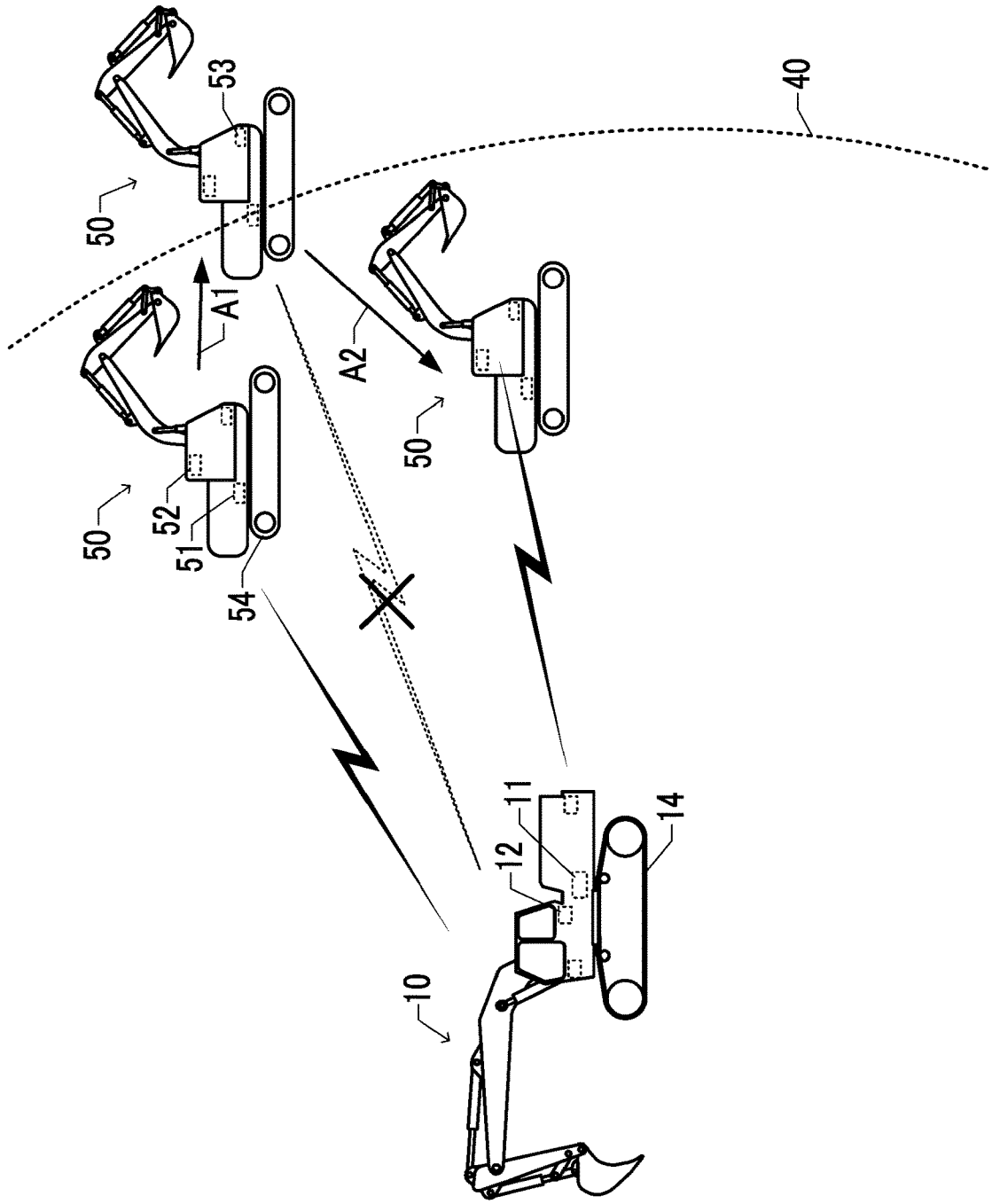
FIG. 6 is a schematic view of a construction machine according to still another embodiment.

FIG. 6 is a schematic view of construction machines 10 and 50 according to the present embodiment. When the other construction machine 50 is disposed within a communicable area 40 of the communication unit 12 of the construction machine 10, short-range wireless communication can be performed between the construction machine 10 and the construction machine 50. When the construction machine 50 moves as indicated by an arrow A1 and goes out of a communicable area 40, short-range wireless communication cannot be performed between the construction machine 10 and the construction machine 50.

When the information processing unit 51 of the construction machine 50 detects that communication with the construction machine 10 has become not possible, the information processing unit 51 issues a command to the running mechanism 54 to move in a direction approaching the construction machine 10, as indicated by an arrow A2. When it is detected that an intensity of radio waves from the construction machine 10 is equal to or lower than a communicable lower limit value, it may be determined that the construction machine 50 is unable to communicate with the construction machine 10. When the construction machine 50 returns to an inside of the communicable area 40, it is possible to resume the short-range wireless communication between the construction machine 10 and the construction machine 50.

Next, a method of determining a direction in which the construction machine 50 approaches the construction machine 10 will be described. For example, when the construction machine 50 goes out of the communicable area 40, the information processing unit 51 turns a rotating platform, and the sensor 53 acquires an image of surroundings. The construction machine 10 is detected by analyzing the acquired image. Accordingly, the direction in which the construction machine 50 approaches the construction machine 10 can be determined.

Next, excellent effects of the embodiment shown in FIG. 6 will be described.

In the present embodiment, even when the construction machine 50 goes out of the communicable area 40, the construction machine 50 autonomously returns to the inside of the communicable area 40. Therefore, it is possible to maintain a state in which the short-range wireless communication between the construction machine 10 and the construction machine 50 is possible. Accordingly, the construction machine 10 can use the construction machine 50 as an external information processing device.

Next, a modification example of the present embodiment will be described.

In this modification example, the direction in which the construction machine 50 approaches the construction machine 10 is determined by acquiring the image of the surroundings with the sensor 53 of the construction machine 50. As another method, GPS positional information may be used. For example, when the construction machine 10 and the construction machine 50 can communicate with each other, they mutually exchange their positional information. When communication with the construction machine 10 becomes not possible, the construction machine 50 determines a direction approaching the construction machine 10 based on the positional information of the construction machine 10 received while communicating with the construction machine 10. Further, based on a work plan, positional information of a place where the construction machine 10 works may be stored in advance in the other construction machine 50.

In addition, the construction machine 50 may obtain a distance between the construction machine 10 and the construction machine 50 based on the positional information of the construction machine 10 and the construction machine 50 and may move such that the distance does not exceed a communicable distance. Accordingly, it is possible to maintain a state in which the short-range wireless communication between the construction machine 10 and the construction machine 50 can be performed.

Next, a construction machine and an information processing system according to still another embodiment will be described with reference to FIG. 7. Hereinafter, description of a configuration common to the construction machine and the information processing system according to the embodiment shown in FIG. 6 will not be repeated.

Figure 7:
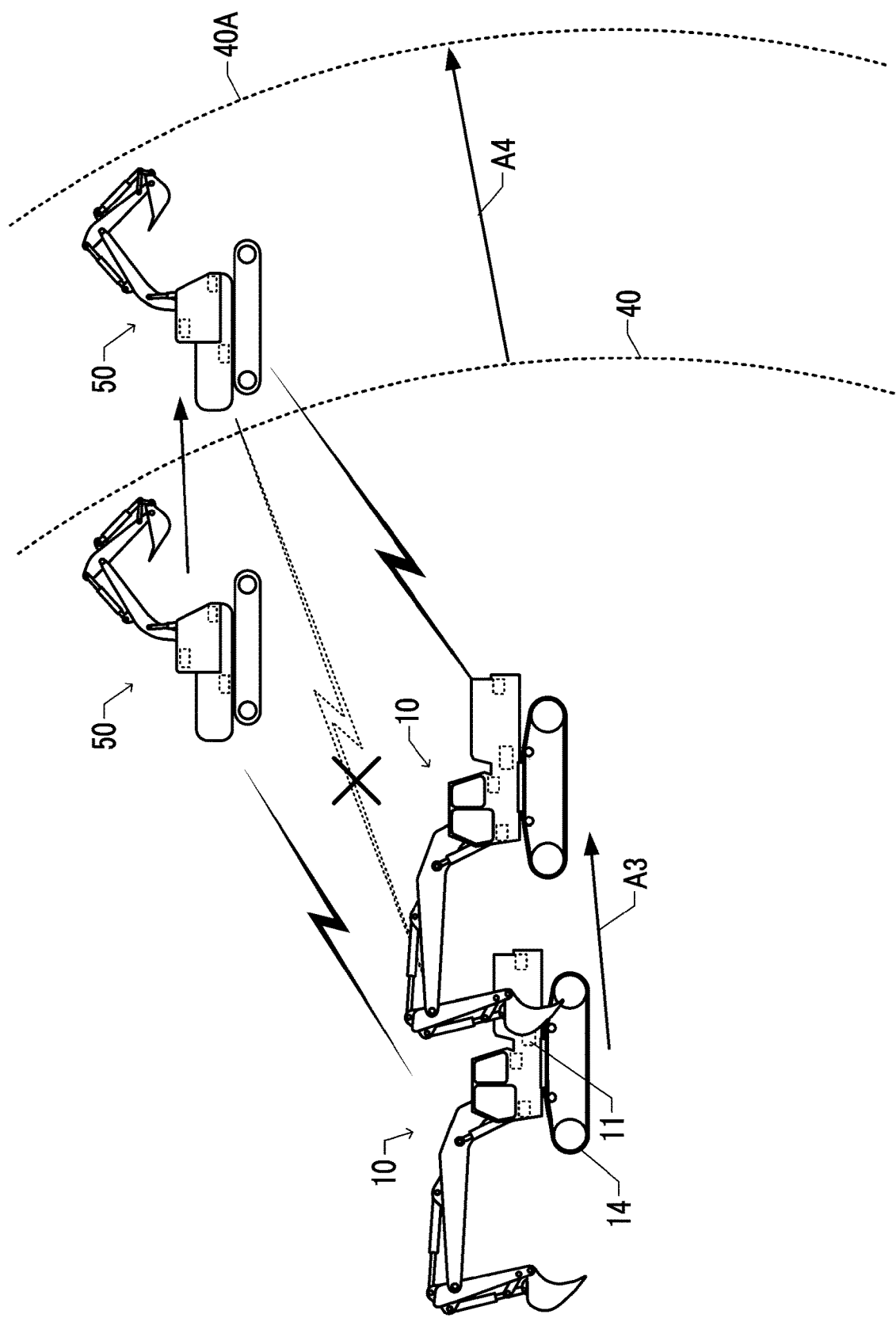
FIG. 7 is a schematic view of a construction machine according to still another embodiment.

FIG. 7 is a schematic view of construction machines 10 and 50 according to the present embodiment. In the embodiment shown in FIG. 6, when the construction machine 50 goes out of the communicable area 40 of the construction machine 10, the construction machine 50 returns to the inside of the communicable area 40. On the other hand, in the embodiment shown in FIG. 7, when the information processing unit 11 of the construction machine 10 detects that the communication with the construction machine 50 becomes not possible, the information processing unit 11 issues a command to the running mechanism 14 to move in a direction approaching the construction machine 50. Accordingly, the construction machine 10 moves as indicated by an arrow A3, and the communicable area 40 moves to a communicable area 40A as indicated by an arrow A4. As a result, the construction machine 50 enters the inside of the communicable area 40A of the construction machine 10 again.

Next, excellent effects of the embodiment shown in FIG. 7 will be described.

In the present embodiment, as the construction machine 10 moves, a state in which the short-range wireless communication between the construction machine 10 and the construction machine 50 is possible can be maintained. This method of the present embodiment may be adopted in a case where the work is not hindered even when the construction machine 10 moves. On the contrary, the method of the embodiment shown in FIG. 6 may be adopted in a case where the work is hindered when the construction machine 10 moves.

Next, a construction machine and an information processing system according to still another embodiment will be described with reference to FIG. 8. Hereinafter, description of a configuration common to the construction machine and the information processing system according to the embodiment described with reference to FIG. 5 will not be repeated.

Figure 8:
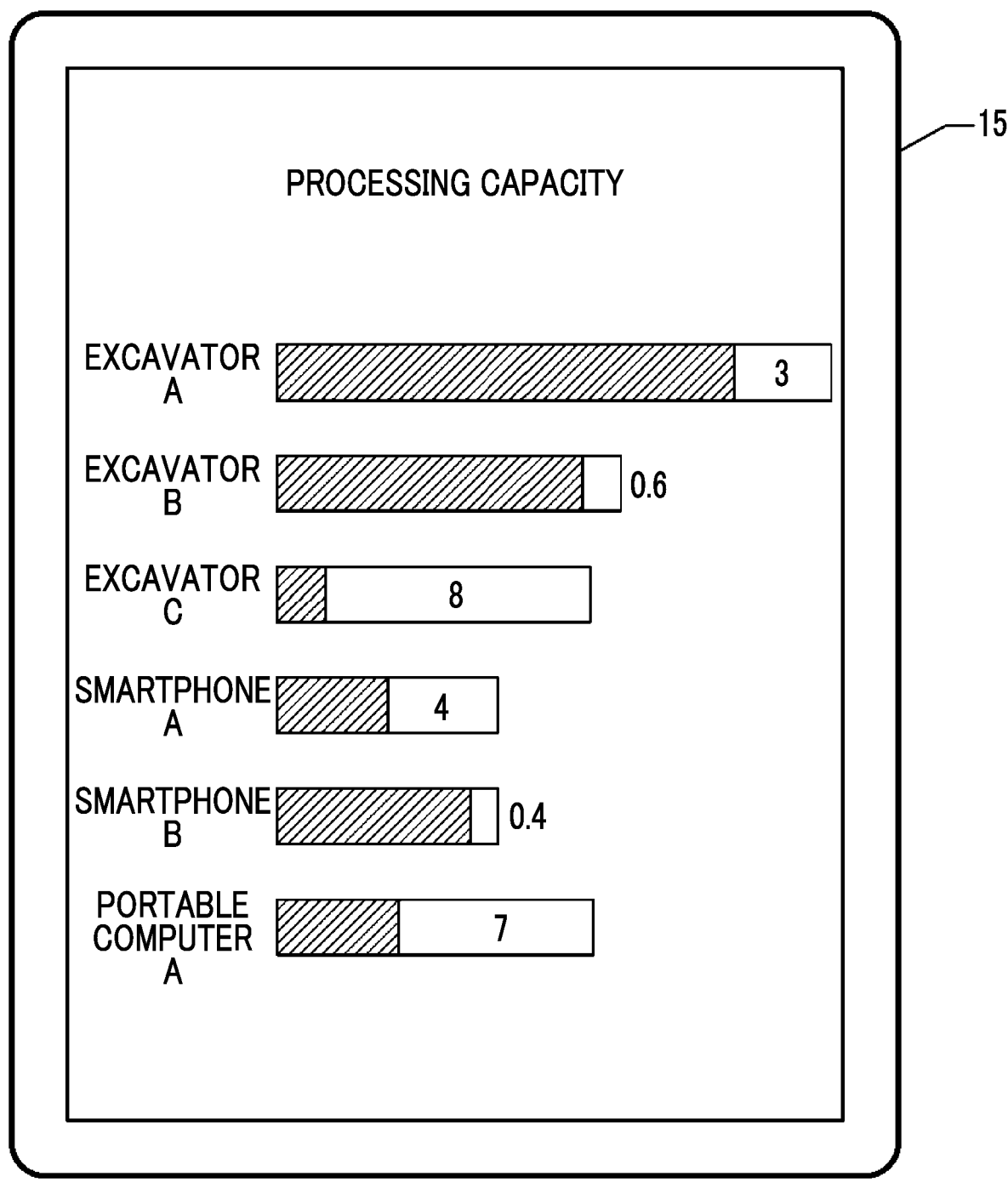
FIG. 8 is a front view of a display unit mounted on a construction machine according to still another embodiment.

FIG. 8 is a front view of the display unit 15 mounted on the construction machine 10 according to the present embodiment. When the construction machine 10 receives margin information indicating the degree of the margin in the processing capacity from a plurality of members of the distributed processing network, the degree of the margin in the processing capacity for each member is displayed on the display unit 15 in a mode recognizable by a worker or the like. For example, the degree of the margin in the processing capacity is displayed on the display unit 15 as a horizontal bar graph for each member. Further, the degree of the margin in the processing capacity may be displayed on an external information processing device such as a smartphone, a tablet terminal, or a portable computer that is added to the distributed processing network.

A length of a horizontal bar represents the processing capacity (computational resource) of each of the plurality of members of the distributed processing network. A range (hatched range in FIG. 8) corresponding to a proportion of the processing capacity occupied by processing currently being executed (computational resource in use) is displayed to be distinguished from the remaining range (blank range in FIG. 8). A length of the remaining range corresponds to the degree of the margin in the processing capacity (unused computational resource). The degree of the margin in the processing capacity is displayed with a numerical value. The numerical value corresponds to, for example, a size of image data that can be processed per unit time, the number of images, or the like.

Next, excellent effects of the embodiment shown in FIG. 8 will be described. An on-site worker can determine whether a total processing capacity of construction machines, smartphones, portable computers, tablet terminals, and the like operating at the work site is sufficient or insufficient from the information indicating the degree of the margin in the processing capacity displayed on the display unit 15. In a case where the total processing capacity is insufficient, measures can be taken to operate information processing devices such as construction machines, smartphones, tablet terminals, and portable computers that are not currently in operation. In a case where all the information processing devices disposed at the work site are in operation, measures can be taken to increase the number of tablet terminals or portable computers.

In a case where the total processing capacity of the construction machines, smartphones, portable computers, tablet terminals, and the like operating at the work site is sufficient, power supplies of some construction machines, portable computers, and the like can be turned off to reduce power consumption.

In a case where one member out of a plurality of members included in the distributed processing network has a function of a server that manages the entire distributed processing network, the number of members assigned to perform a plurality of tasks included in a single job (the number of parallel processes of the distributed processing) can be adjusted according to the degree of the margin in the total processing capacity. In addition, more computational resources can be allocated to a job having a high priority.

Next, a modification example of the embodiment shown in FIG. 8 will be described.

In the present embodiment, the degree of the margin in the processing capacity is displayed on the display unit 15 such that the proportion to the total processing capacity (proportion of unused computational resources) can be recognized, but other indicators may be displayed. For example, in a case where a certain job occurs, a computation time until the job is terminated may be displayed on the display unit 15 so as to be recognizable.

It is needless to say that each of the above-described embodiments is an example, and partial substitutions or combinations of the configurations shown in different embodiments are possible. Similar operations and effects due to similar configurations of a plurality of embodiments will not be mentioned sequentially for each embodiment.

It should be understood that the invention is not limited to the above-described embodiment, but may be modified into various forms on the basis of the spirit of the invention. Additionally, the modifications are included in the scope of the invention.

What is claimed is:

1. A construction machine comprising:
   an information processing unit configured to execute a plurality of tasks; and
   a communication unit configured to perform short-range wireless communication,
   wherein the information processing unit is configured to execute:
   an inquiry process of inquiring at least one external information processing device capable of communicating with the communication unit about a degree of a margin in a processing capacity;
   a margin information reception process of receiving margin information representing the degree of the margin in the processing capacity from the external information processing device;
   a determination process of determining whether or not to request the external information processing device to execute at least a part of the plurality of tasks based on the received margin information;

a task execution request process of requesting the external information processing device to execute at least a part of the tasks when it is determined to request the execution of the task; and a result reception process of receiving an execution result of the task from the external information processing device that has been requested to execute the task.

2. The construction machine according to claim 1, wherein the information processing unit is configured to:

inquire each of a plurality of the external information processing devices about the degree of the margin in the processing capacity in the inquiry process;

determine whether or not to request each of the plurality of external information processing devices to execute at least a part of the tasks in the determination process; and request the external information processing device having the margin in the processing capacity among the plurality of external information processing devices to execute at least a part of the tasks in the task execution request process.

3. The construction machine according to claim 2, wherein the information processing unit is configured to, when requesting the plurality of external information processing devices to execute the task, select the task to be requested in accordance with the margin information of each of the plurality of external information processing devices in the task execution request process.

4. The construction machine according to claim 3, wherein at least one construction machine and the plurality of external information processing devices form a distributed processing network by short-range wireless communication.

5. The construction machine according to claim 4, wherein the external information processing device is a construction machine different from the at least one construction machine.

6. The construction machine according to claim 4, wherein the external information processing device is an information processing terminal.

7. The construction machine according to claim 2, further comprising a display unit, wherein the information processing unit is configured to display, on the display unit, a degree of a margin in a processing capacity of the information processing unit and the degree of the margin in the processing capacity of each of the plurality of external information processing devices inquired about the degree of the margin in the processing capacity.

8. The construction machine according to claim 2, wherein the information processing unit is configured to display, on the external information processing device, a degree of a margin in a processing capacity of the information processing unit and the degree of the margin in the processing capacity of each of the plurality of external information processing devices inquired about the degree of the margin in the processing capacity.

9. The construction machine according to claim 1, further comprising a running mechanism, wherein the information processing unit is configured to, when it is detected that the external information processing device is out of a communicable area for short-range wireless communication, issue a command to the running mechanism to move in a direction approaching the external information processing device.

10. A construction machine comprising:

an information processing unit configured to execute a plurality of tasks; and a communication unit configured to perform short-range wireless communication, wherein the information processing unit is configured to execute:

when there is an inquiry about a degree of a margin in a processing capacity from another construction machine within a range communicable with the communication unit, a process of transmitting margin information representing the degree of the margin in the processing capacity of the information processing unit to the construction machine which is an inquiry source; and when there is a request to execute the task from another construction machine within a range communicable with the communication unit, a process of executing the requested task and returning an execution result to the construction machine which is a request source.

11. The construction machine according to claim 10, further comprising a running mechanism, wherein the information processing unit is configured to, when it is detected that the other construction machine is out of a communicable area for short-range wireless communication, issue a command to the running mechanism to move in a direction approaching the other construction machine.

12. An information processing system comprising:

a construction machine including an information processing unit configured to execute a plurality of tasks, and a communication unit configured to perform short-range wireless communication; and at least one external information processing device configured to perform short-range wireless communication with the construction machine, wherein the information processing unit of the construction machine is configured to execute:

an inquiry process of inquiring the external information processing device about a degree of a margin in a processing capacity;

a margin information reception process of receiving margin information representing the degree of the margin in the processing capacity from the external information processing device;

a determination process of determining whether or not to request the external information processing device to execute at least a part of the plurality of tasks based on the received margin information;

a task execution request process of requesting the external information processing device to execute at least a part of the tasks when it is determined to request the execution of the task; and a result reception process of receiving an execution result of the task from the external information processing device that has been requested to execute the task, and the external information processing device is configured to execute:

when there is an inquiry about a degree of a margin in a processing capacity from the construction machine, a process of transmitting margin information representing the degree of the margin in the processing capacity of the external information processing device to the construction machine; and when there is a request to execute the task from the construction machine, a process of executing the requested task and returning an execution result to the construction machine.

* * * * *